(12) United States Patent
Lin

(10) Patent No.: US 10,449,752 B2
(45) Date of Patent: Oct. 22, 2019

(54) SCREEN FILM APPLICATOR

(71) Applicant: Chia-Ching Lin, Taipei (TW)

(72) Inventor: Chia-Ching Lin, Taipei (TW)

( * ) Notice: Subject to any disclaimer, the term of this patent is extended or adjusted under 35 U.S.C. 154(b) by 17 days.

(21) Appl. No.: 15/823,772

(22) Filed: Nov. 28, 2017

(65) Prior Publication Data

US 2018/0281373 A1 Oct. 4, 2018

(30) Foreign Application Priority Data

Mar. 31, 2017 (TW) .............................. 106204611 U

(51) Int. Cl.
*B32B 37/00* (2006.01)
*B32B 37/10* (2006.01)
(Continued)

(52) U.S. Cl.
CPC ........ *B32B 37/003* (2013.01); *B29C 63/0017* (2013.01); *B29C 63/0047* (2013.01); *B29C 63/02* (2013.01); *B29C 63/024* (2013.01); *B32B 37/0053* (2013.01); *B32B 37/025* (2013.01); *B32B 37/10* (2013.01); *B32B 38/10* (2013.01); *B32B 38/1833* (2013.01); *B29C 2063/0008* (2013.01); *B29C 2063/027* (2013.01); *B29C 2063/028* (2013.01); *B29K 2715/00* (2013.01); *B29K 2995/0026* (2013.01); *B29L 2031/3437* (2013.01); *B32B 2457/20* (2013.01)

(58) Field of Classification Search
CPC ...... B29C 2063/0008; B29C 2063/027; B29C 63/024; B29C 63/02; B29C 63/0017; B29C 63/0047; B25B 27/0092; B25B 33/00; B25B 27/00; G02B 1/14; B32B 38/1833; B32B 37/0053; B32B 2457/20; B32B 37/003; B32B 37/025; B32B 38/10; B32B 37/10; Y10T 156/19; Y10T 156/1978; Y10T 156/1168; B29L 2031/3437; B65D 65/40
USPC ......... 156/538, 750, 764, 931, 934; 226/149
See application file for complete search history.

(56) References Cited

U.S. PATENT DOCUMENTS

| | | | |
|---|---|---|---|
| 2014/0124146 A1* | 5/2014 | Patel | ................... B29C 63/0004 156/574 |
| 2017/0001364 A1* | 1/2017 | MacDonald | .............. B32B 7/06 |

FOREIGN PATENT DOCUMENTS

| | | |
|---|---|---|
| CN | 205499464 U | 8/2016 |
| TW | M473607 U | 3/2014 |

* cited by examiner

*Primary Examiner* — Philip C Tucker
*Assistant Examiner* — Jimmy R Smith, Jr.
(74) *Attorney, Agent, or Firm* — Li & Cai Intellectual Property (USA) Office

(57) ABSTRACT

A screen film applicator includes a seat, a positioning member, and a first mechanism, the latter two of which are disposed on the seat. The seat has a track and a positioning portion arranged beside the track. The positioning member is movable with respect to the positioning portion for clamping a communication device. The first mechanism includes a top fixing member disposed on the seat, a moving carriage movable along the track, a bottom fixing member synchronously movable with the moving carriage, and a roller movable with the moving carriage. The top and the bottom fixing members are configured to respectively fix a top releasing film and a bottom releasing film respectively adhered on two opposite sides of a soft screen film. When the moving carriage is moved away from the top fixing member, the roller can gradually press the soft screen film onto the communication device.

10 Claims, 17 Drawing Sheets

(51) Int. Cl.
    *B29C 63/02*         (2006.01)
    *B29C 63/00*         (2006.01)
    *B32B 38/10*         (2006.01)
    *B32B 38/18*         (2006.01)
    *B29L 31/34*         (2006.01)

SCREEN FILM APPLICATOR

BACKGROUND OF THE INVENTION

1. Field of the Invention

The present disclosure relates to a screen film applicator; in particular, to a screen film applicator capable of allowing a soft screen film to be adhered onto a communication device.

2. Description of Related Art

A soft screen film can be used to adhere onto a screen of a communication device (e.g., a smart phone or a tablet PC), thereby preventing the screen from being damaged. However, the adhesion between the soft screen film and the communication device is implemented manually, so that the soft screen film is difficult to be accurately adhered onto the communication device. For example, a bubble is easily formed between the communication device and the adhered soft screen film, such that the adhered soft screen film has to be removed from the communication device, and a new soft screen film is used to be adhered onto the communication device.

SUMMARY OF THE INVENTION

The present disclosure provides a screen film applicator to effectively improve the drawbacks associated with the conventional soft screen film, which cannot be accurately adhered onto a communication device.

The present disclosure discloses a screen film applicator, includes a seat, a positioning member, and a first mechanism. The seat has a track and a positioning portion arranged at one side of the track for positioning a communication device. The positioning member is disposed on the seat. The positioning member is movable with respect to the seat, and the positioning member and the positioning portion are configured to clamp the communication device. The first mechanism is disposed on the seat for allowing a soft screen film to be adhered onto the communication device. The first mechanism includes a top fixing member, a moving carriage, a bottom fixing member, and a roller. The top fixing member is disposed on the seat. The top fixing member is configured to fix a top releasing film adhered on the soft screen film. The moving carriage is movable along the track of the seat. The bottom fixing member is movable with the moving carriage. The bottom fixing member is configured to fix a bottom releasing film adhered on the soft screen film. The roller is synchronously movable with the moving carriage. When the moving carriage is moved away from the top fixing member, the roller is configured to gradually press the soft screen film onto the communication device.

In summary, the first mechanism of the screen film applicator of the present disclosure can be operated to flatly and accurately allow the soft screen film to be adhered onto the communication device, thereby preventing human errors. Moreover, the screen film applicator can further include the second mechanism, so that the first mechanism and the second mechanism can be selectivity operated to implement an adhesion process of the soft screen film or the glass screen film.

In order to further appreciate the characteristics and technical contents of the present disclosure, references are hereunder made to the detailed descriptions and appended drawings in connection with the present disclosure. However, the appended drawings are merely shown for exemplary purposes, and should not be construed as restricting the scope of the present disclosure.

DETAILED DESCRIPTION OF THE PREFERRED EMBODIMENTS

[First Embodiment]

Reference is made to FIGS. 1 to 13, which illustrate a first embodiment of the present disclosure. References are hereunder made to the detailed descriptions and appended drawings in connection with the present disclosure. However, the appended drawings are merely provided for exemplary purposes, and should not be construed as restricting the scope of the present disclosure.

Figure 1:
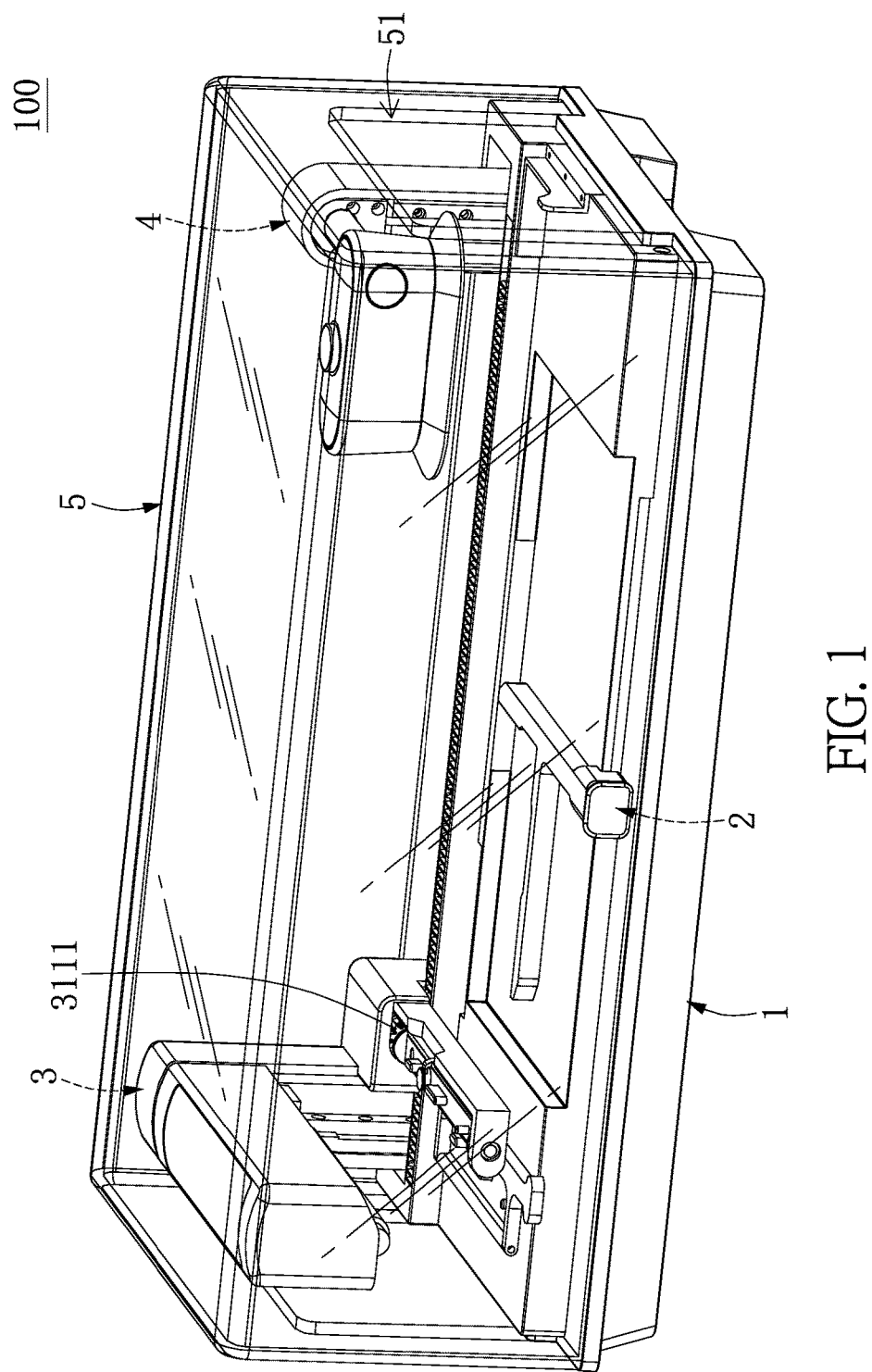
FIG. 1 is a perspective view showing a screen film applicator according to a first embodiment of the present disclosure.
Figure 2:
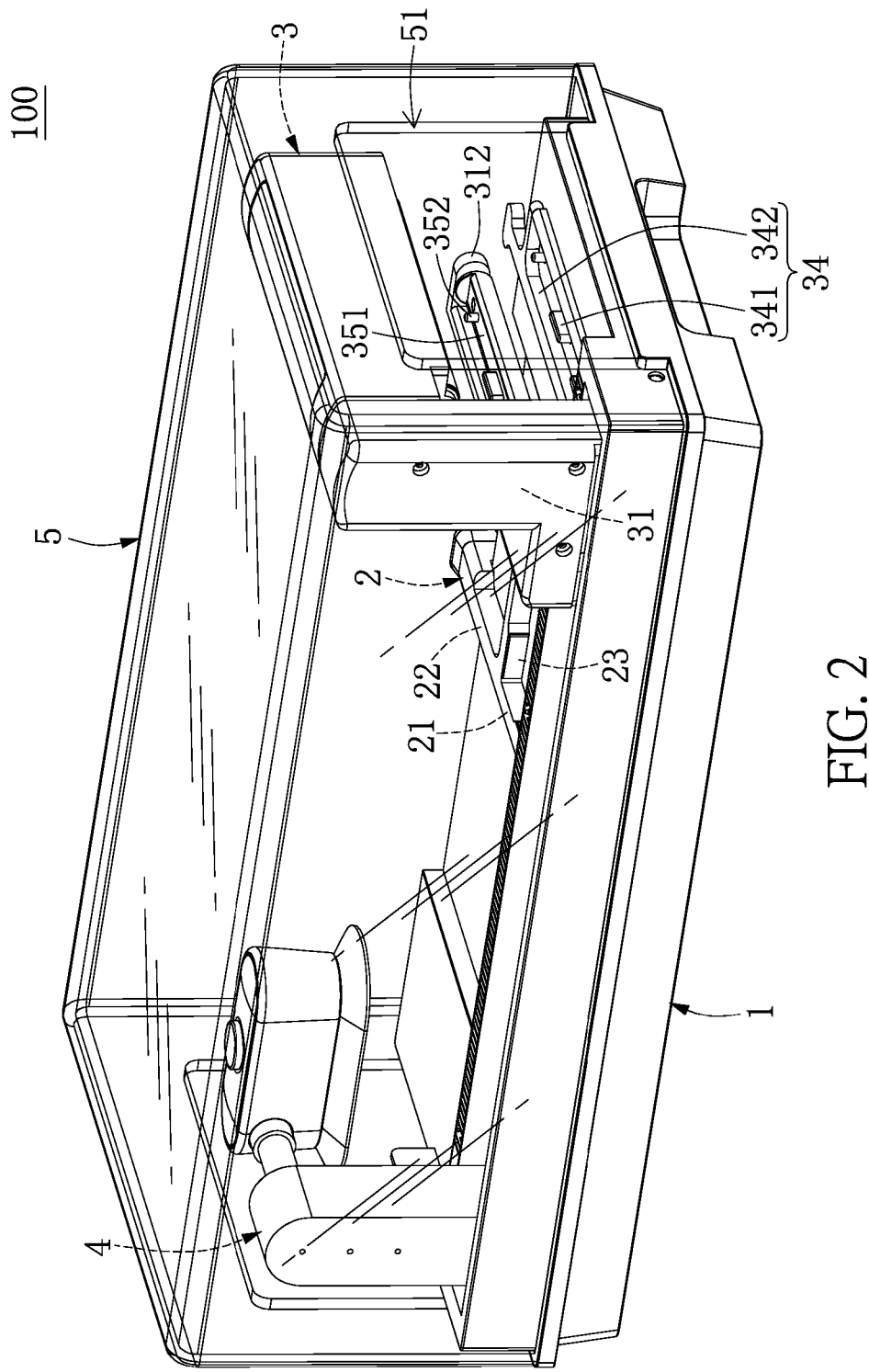
FIG. 2 is a perspective view showing the screen film applicator of FIG. 1 from another perspective.
Figure 3:
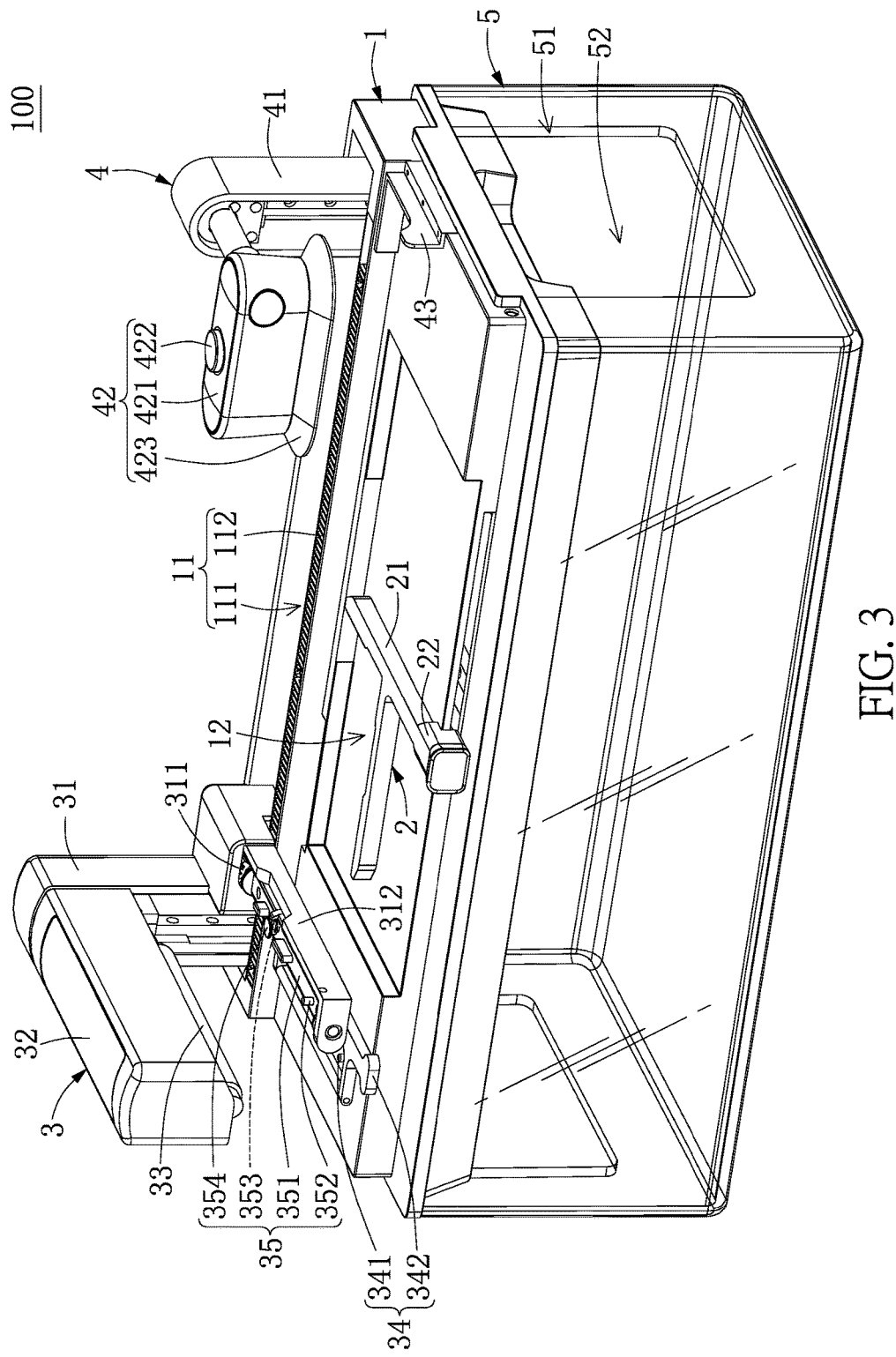
FIG. 3 is a perspective view showing the screen film applicator, which sets a housing under a seat.

Reference is first made to FIGS. 1 to 3, which illustrate a screen film applicator 100 for adhering a soft screen film S (as shown in FIGS. 5 to 8) or a glass screen film H (as shown in FIGS. 9 to 13) onto a screen of a communication device C (e.g., a smart phone or a tablet PC). A top releasing film S1 and a bottom releasing film S2 are respectively adhered on two opposite surfaces of the soft screen film S. The soft screen film S can be bent. A releasing plate H1 is adhered on a bottom surface (i.e., an adhesive surface) of the glass screen film H. The glass screen film H cannot be bent.

The screen film applicator 100 includes a seat 1, a positioning member 2, a first mechanism 3, a second mechanism 4, and a housing 5. The positioning member 2, the first mechanism 3, and the second mechanism 4 are movably disposed on the seat 1. The initial positions of the first mechanism 3 and the second mechanism 4 are substantially arranged on two opposite end portions of the seat 1. The housing 5 is detachably disposed on the seat 1. The following description discloses the structure and connection of each component of the screen film applicator 100.

Figure 5:
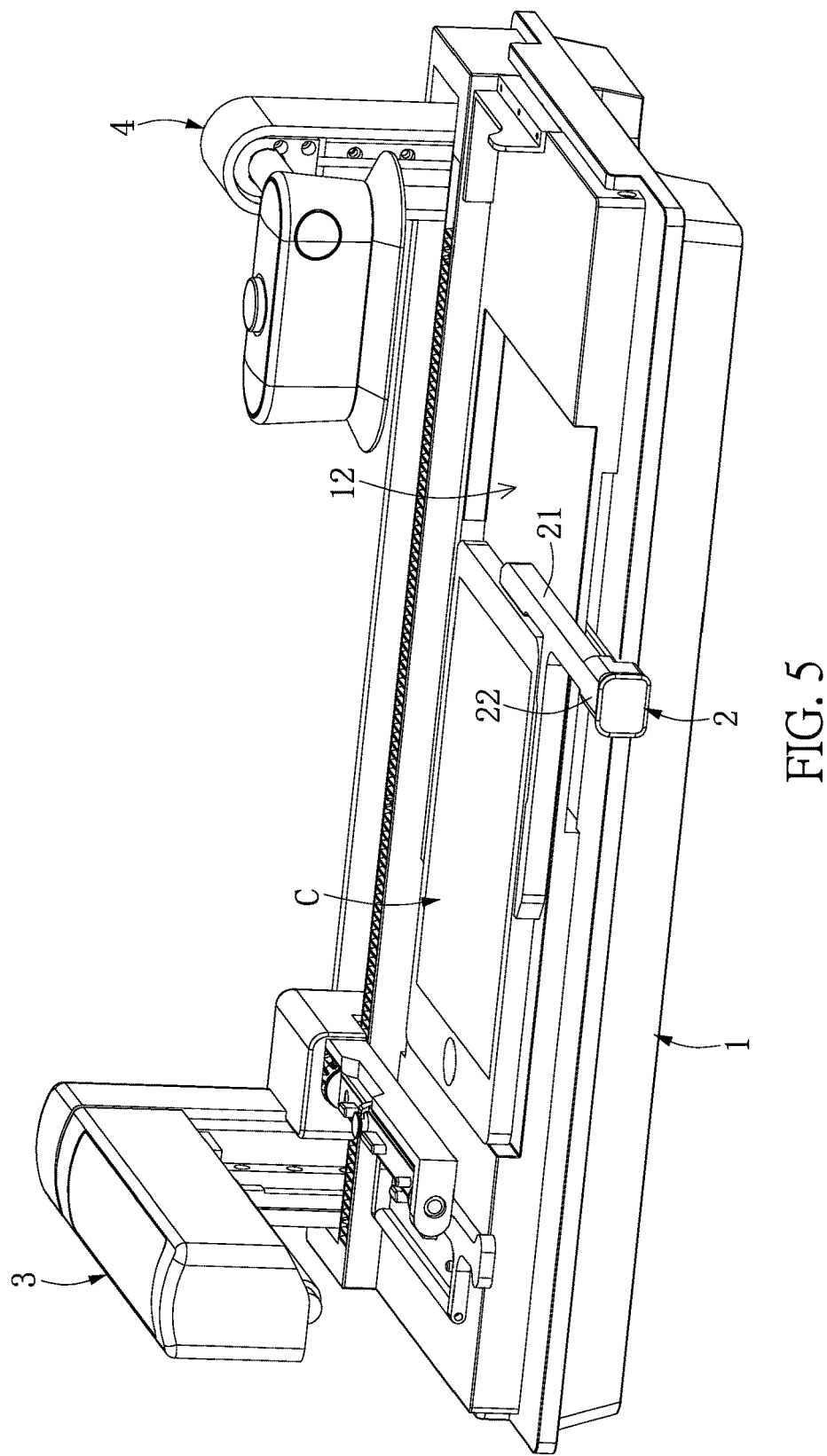
FIG. 5 is a perspective view showing step S110 of the operation of the screen film applicator.

As shown in FIG. 3, the seat 1 has a track 11 and a positioning portion 12 arranged at one side of the track 11 for positioning the communication device C. The track 11 having an elongated structure is arranged on a side portion of the seat 1 (i.e., the rear portion of the seat 1 as shown in FIG. 3). The track 11 includes a groove 111 and a rack 112 parallel to the groove 111, and the rack 112 is arranged between the groove 111 and the positioning portion 12. The positioning portion 12 in the present embodiment is a concavity 12 recessed on a top surface of the seat 1, and the size of the positioning portion 12 is provided for accommodating the communication device C (as shown in FIG. 5) in different sizes.

The positioning member 2 is movable with respect to the seat 1, and the positioning member 2 and the positioning portion 12 are configured to clamp the communication device C. In the present embodiment, the positioning member 2 is integrally formed in a metallic structure, and the positioning member 2 has an L-shaped abutting portion 21 and a manipulating portion 22 connected to an outer corner of the abutting portion 21. The abutting portion 21 is movable in the concavity 12 by using the manipulating portion 22, and an inner corner of the abutting portion 21 and an inner corner of the concavity 12 are configured to respectively clamp two diagonal corners of the communication device C, which can be provided in different sizes (i.e., the upper left corner and the lower right corner of the communication device C as shown in FIG. 5).

In addition, as shown in FIG. 2, the positioning member 2 can be provided with at least one buffering pad 23 (e.g., a silicone pad) fixed on an inner edge of the abutting portion 21, so that when the communication device C is clamped between the abutting portion 21 and the concavity 12, the at least one buffering pad 23 is abutted against the communication device C for preventing the positioning member 2 and the communication device C from a relative movement.

As shown in FIGS. 2 and 3, the first mechanism 3 is configured to allow the soft screen film S to be adhered onto the communication device C. The first mechanism 3 includes a moving carriage 31 movable along the track 11 of the seat 1, a manipulating bar 32 installed on the moving carriage 31, a roller 33 rollably installed on the manipulating bar 32, a top fixing member 34 disposed on the seat 1, and a bottom fixing member 35 movable with the moving carriage 31.

The bottom portion of the moving carriage 31 is arranged in the groove 111, and the moving carriage 31 is movable along the groove 111. In other words, the moving carriage 31 can be moved in a direction away from the top fixing member 34. The moving carriage 31 includes a synchronous module 311 and a cantilever 312. When the moving carriage 31 moves along the groove 111 of the track 11, the manipulating bar 32 and the bottom fixing member 35 are synchronously moved by the synchronous module 311.

Figure 4:
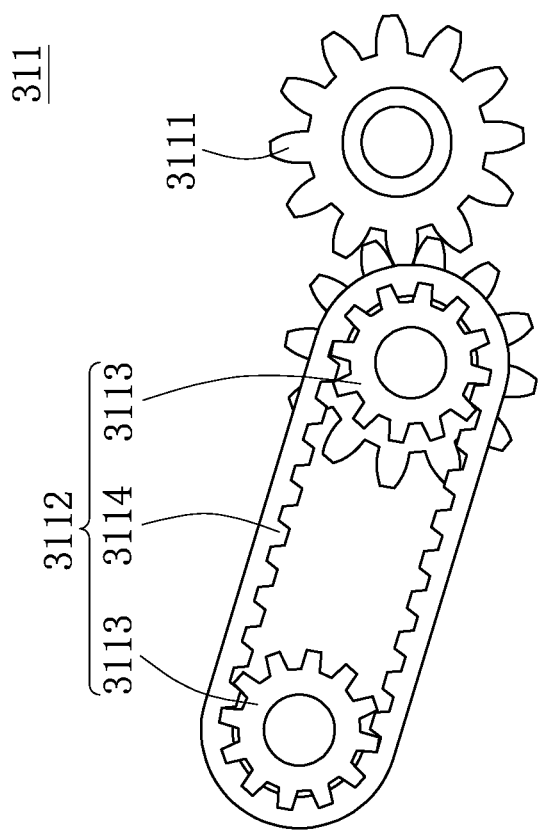
FIG. 4 is a schematic view showing a synchronous module of the screen film applicator.

Specifically, as shown in FIG. 4, the synchronous module 311 includes a gear 3111 and a transmitting unit 3112. The synchronous module 311 is arranged in the groove 111 of the track 11, the gear 3111 is connected to the bottom fixing member 52 and is engaged with the rack 112, and the transmitting unit 3112 is arranged in the moving carriage 31 and is engaged with the gear 3111.

The transmitting unit 3112 in the present embodiment includes two pivots 3113 and a toothed belt 3114. One of the two pivots 3113 is engaged with the gear 3111, and the toothed belt 3114 is engaged with the two pivots 3113. The pivot 3113 engaged with the gear 3111 can drive the other pivot 3113 by the toothed belt 3114, so that a slippery drawback can be avoided by using the toothed belt 3114 to establish the interconnection between the two pivots 3114.

As shown in FIG. 3, the manipulating bar 32 has an elongated structure, and an end of the manipulating bar 32 is substantially and perpendicularly connected to the top portion of the moving carriage 31. The longitudinal direction of the manipulating bar 32 in the present embodiment is substantially perpendicular to that of the track 11. When the moving carriage 31 is moved away from the top fixing member 34, the manipulating bar 32 is synchronously moved with the moving carriage 31 and is configured to be pressed toward the seat 1 along the moving carriage 31 by an external force. Moreover, after the external force is removed, the manipulating bar 32 can be moved to an initial position by using an elastic component (not shown).

The roller 33 having an elongated shape is installed on the manipulating bar 32. The longitudinal direction of the roller 33 is substantially parallel to that of the manipulating bar 32. Moreover, when the manipulating bar 32 is synchronously moved with the moving carriage 31, which is moved away from the top fixing member 34, and is pressed toward the seat 1 along the moving carriage 31, the roller 33 is configured to gradually press the soft screen film S onto the screen of the communication device C.

The top fixing member 34 is configured to fix the top releasing film S1 adhered on the soft screen film S. The top fixing member 34 includes a plurality of top positioning pillars 341 disposed on the seat 1 and a covering plate 342 pivotally connected to the seat 1. The top positioning pillars 341 are configured to respectively insert into holes formed on the top releasing film S1, and the covering plate 342 and the seat 1 are configured to clamp a portion of the top releasing film S1, which has the holes. Moreover, a free end of the covering plate 342 can be fixed on the seat 1 by using a magnetic force, but the present disclosure is not limited thereto.

Specifically, the number of the top positioning pillars 341 in the present embodiment is three, which are a round pillar (not labeled) and two elongated pillars (not labeled) having their respective lengths. Specifically, the longer elongated pillar is arranged between the shorter elongated pillar and the round pillar. The holes of the top releasing film S1 are respectively corresponding in shape to the round pillar and the two elongated pillars, and the length of each of the two elongated pillars is slightly smaller than that of the corresponding hole of the top releasing film S1. Thus, the top fixing member 34 can be firmly connected to the top releasing film S1 by using the above arrangement.

The bottom fixing member 35 is configured to fix the bottom releasing film S2 adhered on the soft screen film S. One of two opposite ends of the bottom fixing member 35 is fixed on the gear 3111 of the moving carriage 31, and the other end of the bottom fixing member 35 is pivotally connected to the cantilever 312 of the moving carriage 31, so that when the gear 3111 is rotated along the rack 112, the bottom fixing member 35 is spun at the same time. The bottom fixing member 35 includes an elongated rod 351, a plurality of bottom fixing pillars 352 disposed on the rod 351, a magnetic block 353 embedded in the rod 351 and arranged between two of the bottom fixing pillars 352, and a magnetic cover 354 movably connected to the rod 351.

Moreover, the bottom fixing pillars 352 are configured to respectively insert into holes formed on the bottom releasing film S2. The number of the bottom fixing pillars 352 in the present embodiment is three, which are a round pillar (not labeled) and two elongated pillars (not labeled) having their respective lengths. Specifically, the longer elongated pillar is arranged between the shorter elongated pillar and the round pillar, and the magnetic block 353 is arranged between the two elongated pillars. The holes of the bottom releasing film S2 are respectively corresponding in shape to the round pillar and the two elongated pillars, and the length of each of the two elongated pillars is slightly smaller than that of the corresponding hole of the bottom releasing film S2. Thus, the bottom fixing member 35 can be firmly connected to the bottom releasing film S2 by using the above arrangement.

The magnetic cover 354 and the magnetic block 353 are detachably connected to each other for clamping a portion of the bottom releasing film S2, which has the holes. The magnetic block 353 in the present embodiment can be a magnet, and the magnetic cover 354 includes a magnetic part (e.g., a metal or a magnet) and a bendable belt (e.g., a silicone belt). An end portion of the belt covers the magnet, and the other end portion of the belt is connected to the rod 351, but the present disclosure is not limited thereto.

The structure of the first mechanism 3 of the present embodiment has been disclosed in the above description, and the following description simply discloses the operation of the first mechanism 3 of the screen film applicator 100, which includes steps S110 to S130, but the present disclosure is not limited thereto.

Reference is made to FIG. 5, which illustrates the step S110. The communication device C is disposed in the concavity 12 and the screen of the communication device C is arranged upward, and then the positioning member 2 is adjusted to use the inner corner of the abutting portion 21 of the positioning member 2 and the inner corner of the concavity 12 to respectively clamp the two diagonal corners of the communication device C.

Figure 6:
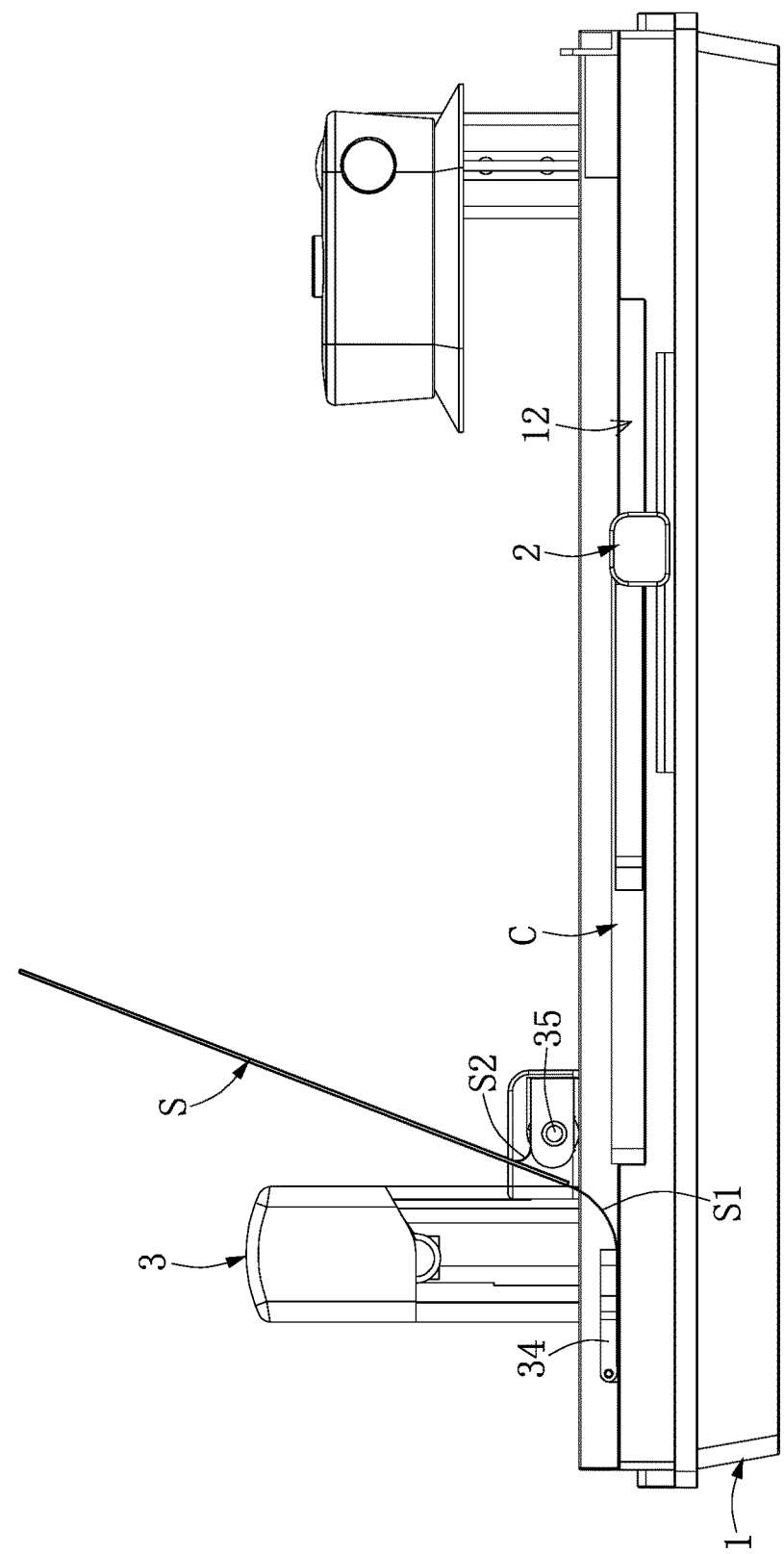
FIG. 6 is a planar view showing step S120 of the operation of the screen film applicator.

Reference is made to FIG. 6, which illustrates the step S120. The portions of the top releasing film S1 and the bottom releasing film S2, which are formed with the holes, are torn from the soft screen film S to respectively fasten to the top fixing member 34 and the bottom fixing member 35. Specifically, as shown in FIG. 3, the covering plate 342 is rotated away from the top fixing pillars 341, the holes of the top releasing film S1 are respectively sleeved at the top fixing pillars 341, and then the covering plate 342 is rotated to press on the top releasing film S1. Moreover, the magnetic cover 354 is separated from the magnetic block 353, the holes of the bottom releasing film S2 are respectively sleeved at the bottom fixing pillars 352, and then the magnetic cover 354 is moved to magnetically connect with the magnetic block 353 so as to clamp the bottom releasing film S2.

Figure 7:
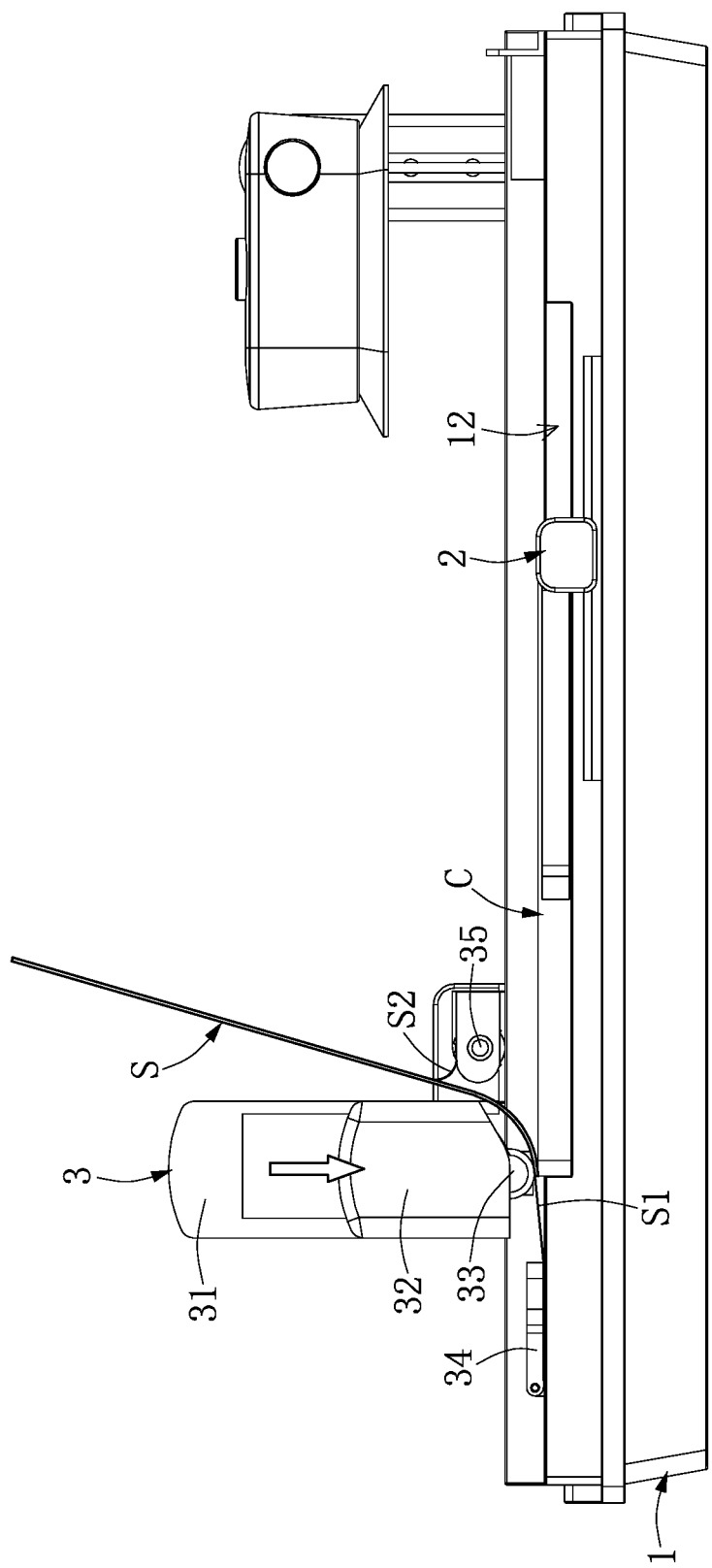
FIG. 7 is a first planar view showing step S130 of the operation of the screen film applicator.
Figure 8:
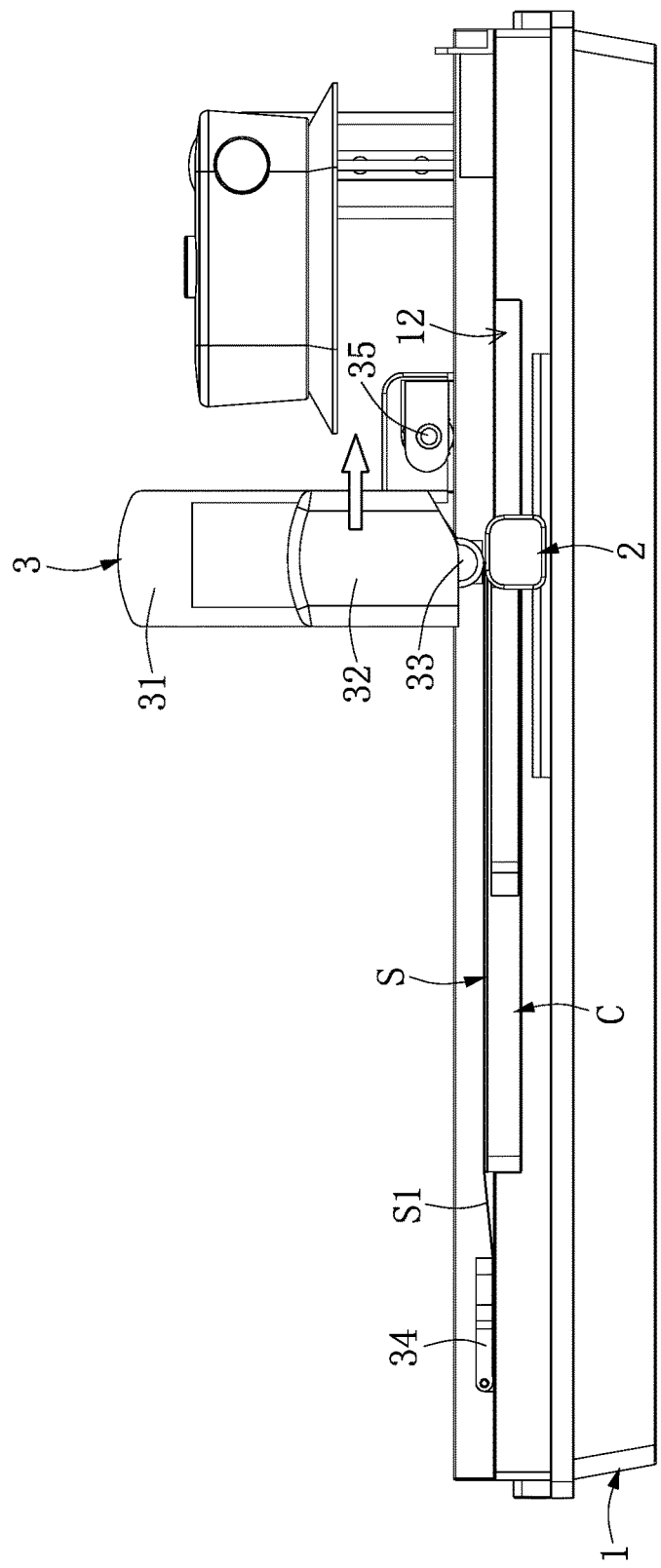
FIG. 8 is a second planar view showing step S130 of the operation of the screen film applicator.

Reference is made to FIGS. 7 and 8, which illustrate the step S130. The manipulating bar 32 is downward pressed along the moving carriage 31 and the manipulating bar 32 and the bottom fixing member 35 are moved with the moving carriage 31 in a horizontal direction away from the top fixing member 34. In the above horizontal movement, the bottom fixing member 35 is spun to tear the bottom releasing film S2 from the soft screen film S, and the roller 33 is rotated to press the soft screen film S onto one end of the communication device C until the soft screen film S is pressed onto the other end of the communication device C, thereby flatly and accurately adhering the soft screen film S onto the communication device C.

As shown in FIGS. 2 and 3, the second mechanism 4 is configured to allow the glass screen film H to be adhered onto the communication device C, and the first mechanism 3 and the second mechanism 4 in the present embodiment are not manipulated at the same time. That is to say, the first mechanism 3 and the second mechanism 4 are selectivity operated. The second mechanism 4 includes a stand 41 disposed on the seat 1, an inhaling member 42 installed on the stand 41, and a positioning frame 43 selectivity disposed on the seat 1 for positioning the glass screen film H. The inhaling member 42 is manipulatable to suck the glass screen film H.

Specifically, the stand 41 is movable along the track 11 of the seat 1 (i.e., the bottom portion of the stand 41 is arranged in the groove 111, and the stand 41 is movable along the groove 111). The inhaling member 42 is pivotally connected to a top portion of the stand 41. The inhaling member 42 is configured to be pressed toward the seat 1 along the stand 41 by an external force, thereby sucking the glass screen film H. Moreover, after the external force is removed, the inhaling member 42 can be moved to an initial position by using an elastic component (not shown).

The inhaling member 42 in the present embodiment includes an inhaling unit 421, a manipulating button 422 partially protruding from the top surface of the inhaling unit 421, and an isolating shield 423 disposed on the periphery of the bottom surface of the inhaling unit 421. The inhaling unit 421 has only one hole (not shown) arranged on a center portion of the bottom surface thereof. Thus, when the manipulating button 422 of the inhaling member 42 is pressed, the glass screen film H can be fixed on the isolating shield 423 of the inhaling member 42 by using the hole to suck the glass screen film H.

Moreover, the positioning frame 43 having an L-shaped structure is detachably inserted into a portion of the seat 1 arranged beside the positioning portion 12 (i.e., the portion of the seat 1 between the positioning portion 12 and the top fixing member 34 as shown in FIG. 3), so that a corner of the releasing plate H1 can be abutted against an inner corner of the positioning frame 43 for maintaining the relative position between the glass screen film H and the communication device C, the latter one of which is arranged in the concavity 12. In addition, when the positioning frame 43 is not used, the positioning frame 43 can be inserted into a portion of the seat 1 arranged away from the top fixing member 43, thereby preventing the operation of the first mechanism 3 from interference.

The structure of the second mechanism 4 of the present embodiment has been disclosed in the above description, and the following description simply discloses the operation of the second mechanism 4 of the screen film applicator 100, which includes steps S210 to S240, but the present disclosure is not limited thereto.

Figure 9:
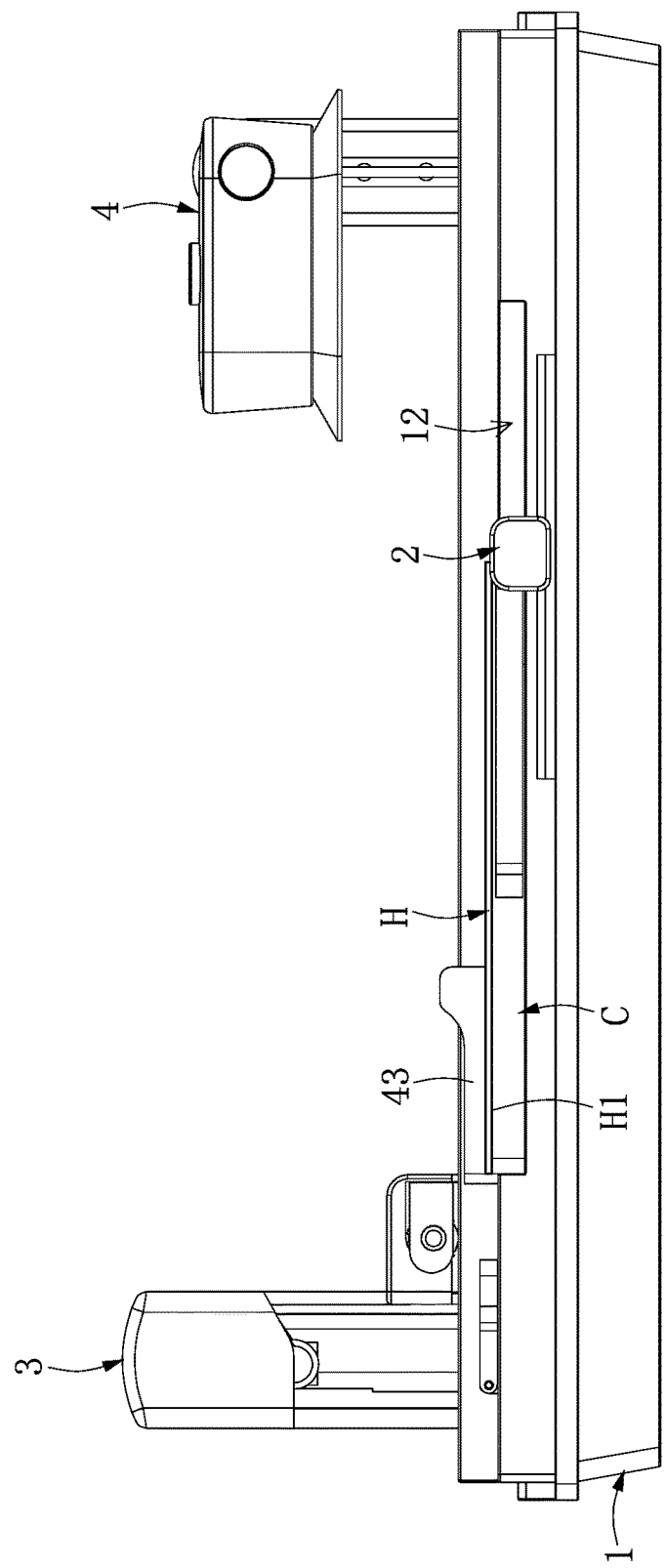
FIG. 9 is a planar view showing steps S210 and S220 of the operation of the screen film applicator.

Reference is made to FIG. 9, which illustrates the step S210. The communication device C is disposed in the concavity 12 and the screen of the communication device C is arranged upward, and then the positioning member 2 is adjusted to use the inner corner of the abutting portion 21 of the positioning member 2 and the inner corner of the concavity 12 to respectively clamp the two diagonal corners of the communication device C.

Reference is made to FIG. 9, which illustrates the step S220. The positioning frame 43 is inserted into the portion of the seat 1 arranged beside the positioning portion 12, and then a corner of the releasing plate H1 is abutted against the inner corner of the positioning frame 43 so as to dispose the releasing plate H1 on the communication device C, thereby implementing an alignment between the glass screen film H and the communication device C.

Figure 10:
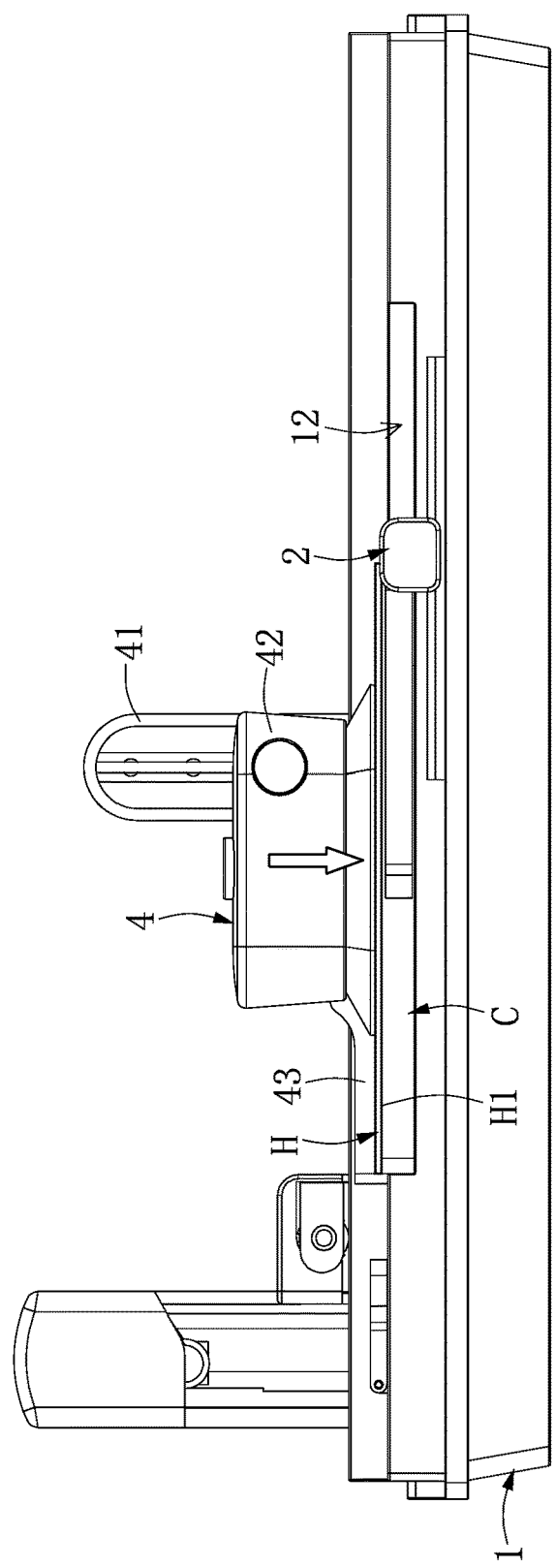
FIG. 10 is a first planar view showing step S230 of the operation of the screen film applicator.
Figure 11:
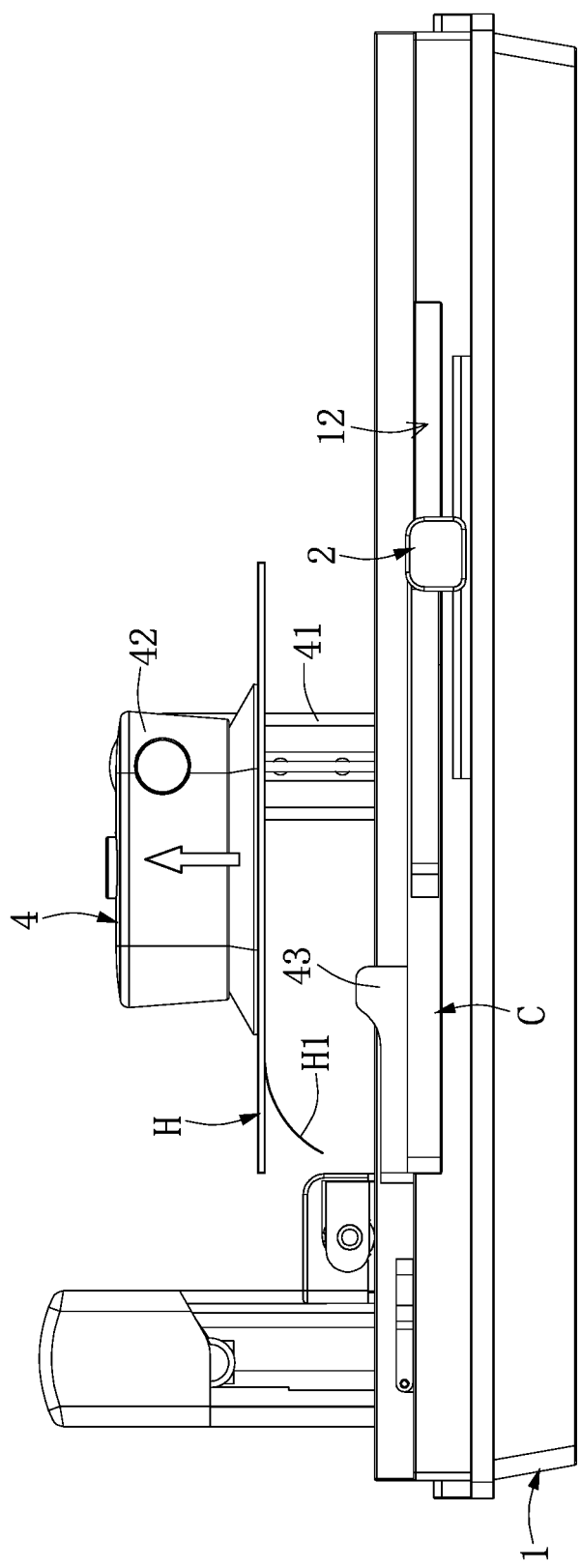
FIG. 11 is a second planar view showing step S230 of the operation of the screen film applicator.

Reference is made to FIGS. 10 and 11, which illustrate the step S230. The stand 41 is moved along the groove 111 of the track 11 to set the inhaling member 42 above a center portion of the glass screen film H, and then the inhaling member 42 is downward pressed along the stand 41 to suck the glass screen film H. After that, the inhaling member 42 is upward moved to separate the glass screen film H and the releasing plate H1 from the communication device C, and then the releasing plate H1 is torn from the glass screen film H.

Figure 12:
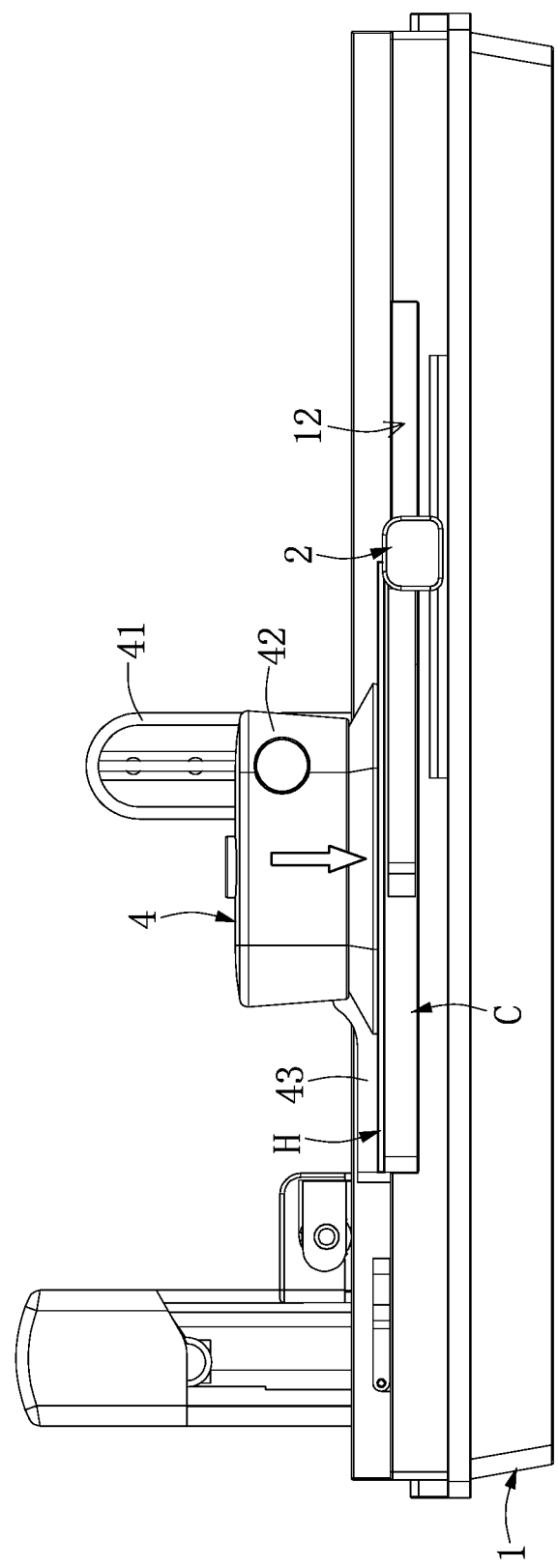
FIG. 12 is a first planar view showing step S240 of the operation of the screen film applicator.
Figure 13:
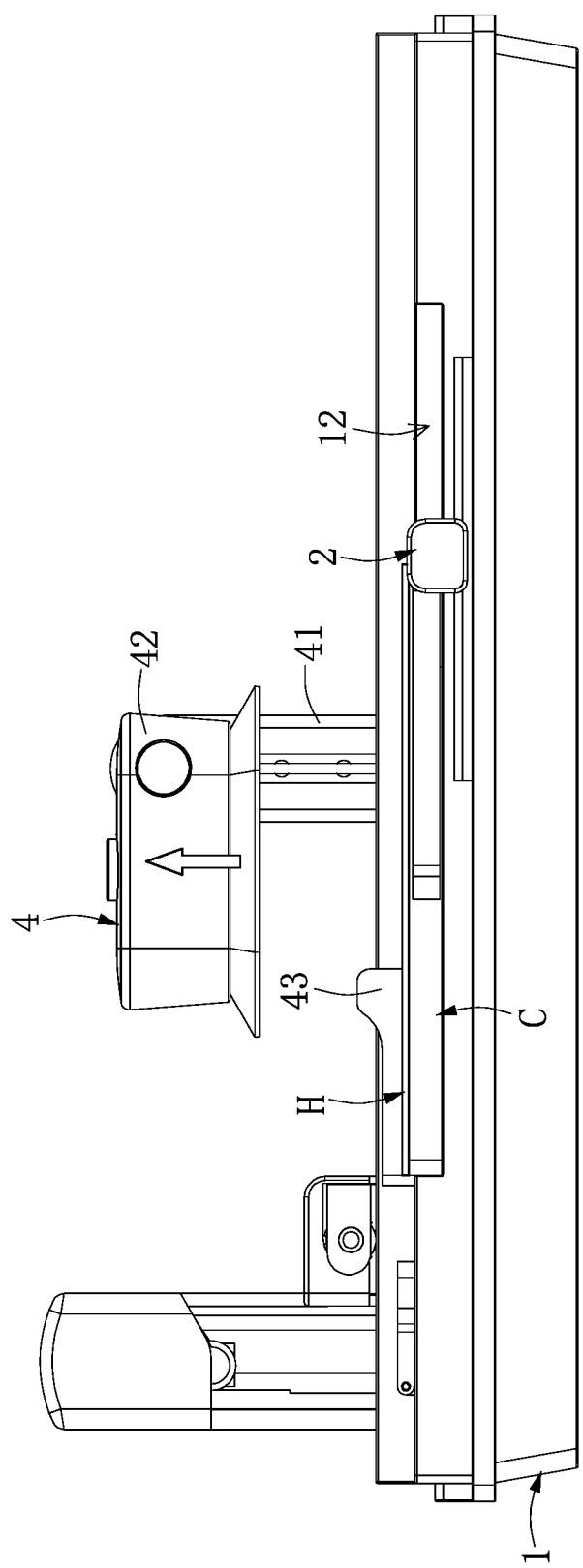
FIG. 13 is a second planar view showing step S240 of the operation of the screen film applicator.

Reference is made to FIGS. 12 and 13, which illustrate the step S240. The inhaling member 42 is downward pressed along the stand 41 to accurately put the glass screen film H onto the communication device C, and then the inhaling member 42 is operated to release the glass screen film H and is upward moved to the initial position. Accordingly, the glass screen film H is flatly and accurately adhered onto the communication device C.

As show in FIGS. 1 to 3, two opposite end portions of the housing 5 each have a notch 51, and the housing 5 is selectivity disposed on the top surface and the bottom surface of the seat 1. When the housing 5 is disposed on the top surface of the seat 1, the housing 5 substantially covers the positioning member 2, the first mechanism 3, and the second mechanism 4, thereby avoiding pollution or damage. When the housing 5 is disposed on the bottom surface of the seat 1, the housing 5 and the bottom surface of the seat 1 jointly define an accommodating space 52, and the two notches 51 are in air-communication with the accommodating space 52 and are respectively adjacent to the first mechanism 3 and the second mechanism 4, so that the accommodating space 52 can be used to accommodate tools or supplies (e.g., soft screen films or glass screen films), but the present disclosure is not limited thereto.

In addition, the bottom surface of the seat 1 can be directly disposed on a desktop, that is to say, the housing 5 is not disposed on the bottom surface of the seat 1. Moreover, in other embodiments of the present disclosure, the screen film applicator 100 can be provided without any housing 5.

[Second Embodiment]

Figure 14:
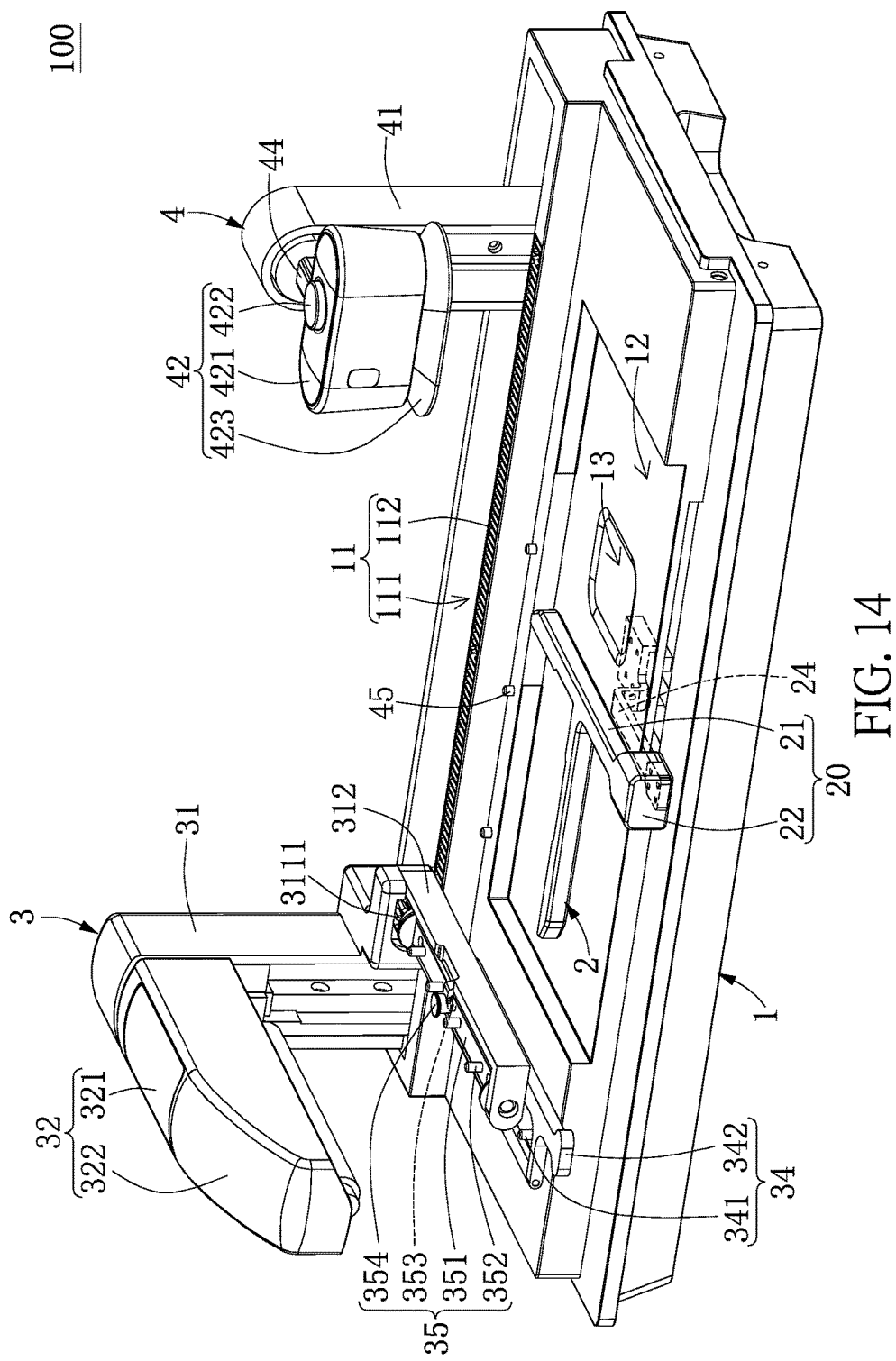
FIG. 14 is a perspective view showing the screen film applicator according to a second embodiment of the present disclosure when the housing is omitted.
Figure 15:
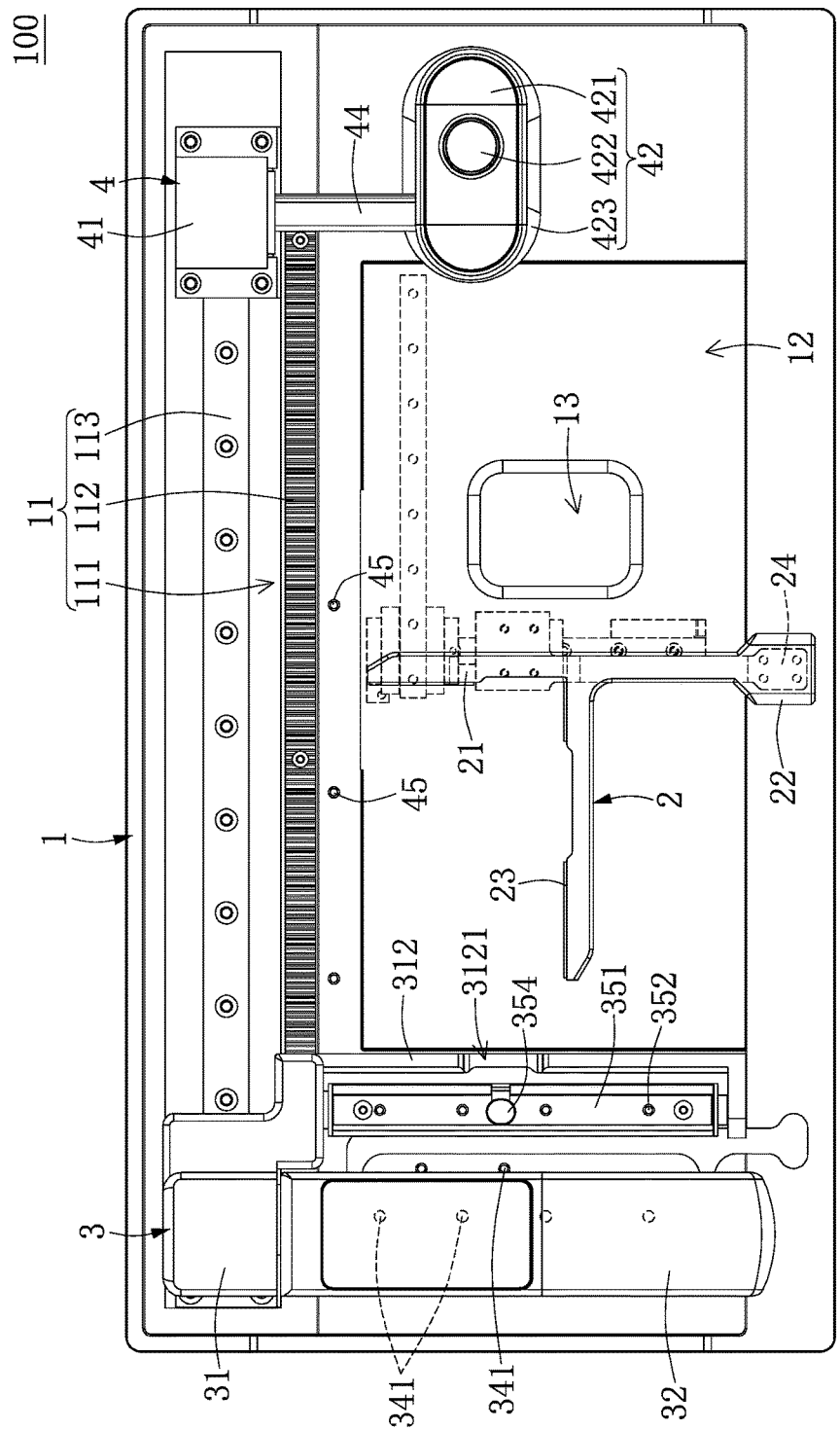
FIG. 15 is a top planar view of FIG. 14.
Figure 16:
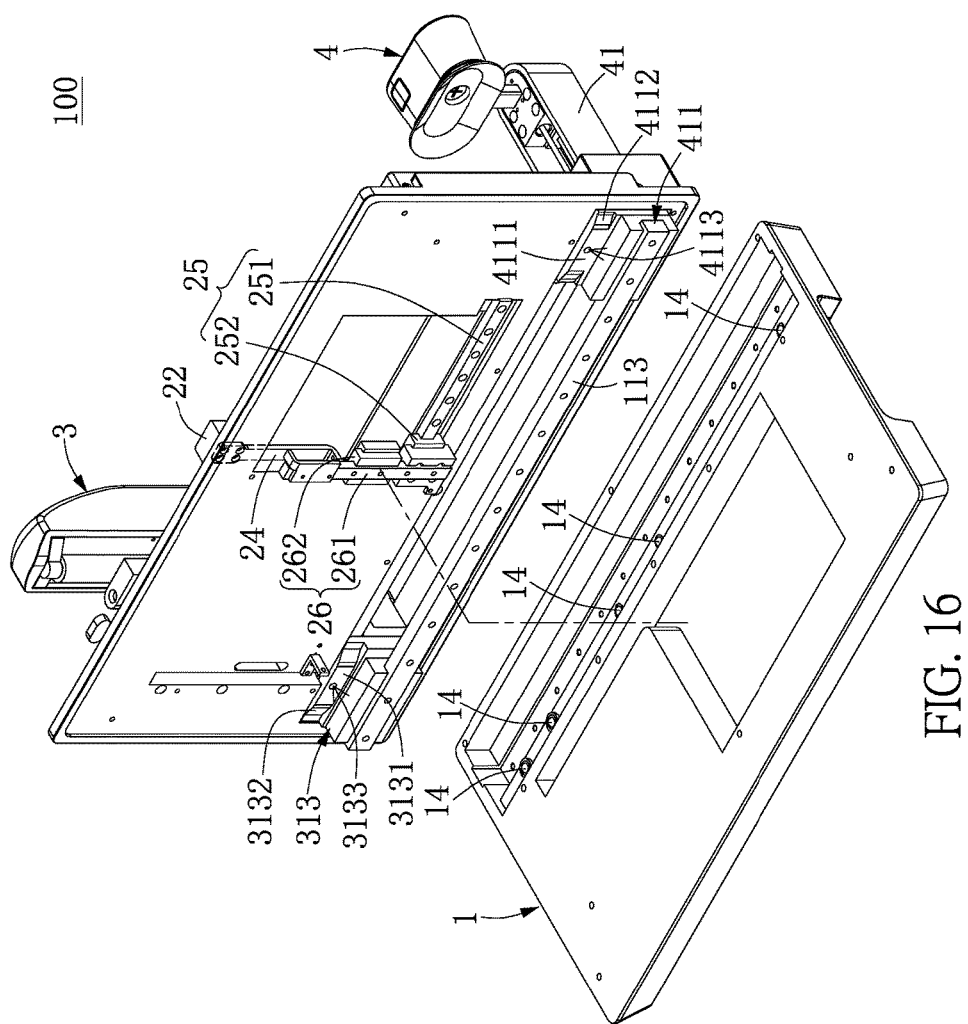
FIG. 16 is an exploded view of FIG. 14.

Reference is made to FIGS. 14 to 16, which illustrate a second embodiment of the present disclosure. The second embodiment is similar to the first embodiment, and the difference between the two embodiments is disclosed as follows.

The seat 1 has an accommodating slot 13 recessed on a bottom surface of the concavity 12 for accommodating a camera module of the communication device C, so that the communication device C can be flatly disposed on the bottom surface of the concavity 12. Moreover, the seat 1 further includes a plurality of positioning balls 14 and a rail 113 arranged in the groove 111. The moving carriage 31 further includes a limiting carrier 313 slidably disposed on the rail 113, and the positioning balls 14 are corresponding in position to the bottom surface of the limiting carrier 313. The positioning balls 14 are spaced away from each other and are arranged in one row parallel to the bottom surface of the limiting carrier 313.

The abutting portion 21 and the manipulating portion 22 of the positioning member 2 are co-defined as a T-shaped shaft 20. The positioning member 2 further includes a reinforcing sheet 24, a longitudinal linear guideway 25, and a transversal linear guideway 26, which are fastened to and approximately arranged in the seat 1. The longitudinal linear guideway 25 and the transversal linear guideway 26 are interconnected to each other. The reinforcing sheet 24 is fixed to the manipulating portion 22 of the T-shaped shaft 20 and one of the longitudinal linear guideway 25 and the transversal linear guideway 26.

Specifically, the longitudinal linear guideway 25 is substantially parallel to the longitudinal direction of the seat 1. A rail 251 of the longitudinal linear guideway 25 is fixed on the seat 1, and a slider 252 of the longitudinal linear guideway 25 is slidably disposed on the rail 251 and is fixed on a rail 261 of the transversal linear guideway 26. The rail 261 of the transversal linear guideway 26 is substantially parallel to the width direction of the seat 1, and is substantially perpendicular to the rail 251 of the longitudinal linear guideway 25. A slider 262 of the transversal linear guideway 26 is connected to the reinforcing sheet 24. An end portion of the reinforcing sheet 24 protrudes from the seat 1 and is screwed on a bottom surface of the manipulating portion 22 by using four screws, thereby improving the connection between the reinforcing sheet 24 and the manipulating portion 22. Accordingly, the manipulating portion 22 can be cooperated with the longitudinal linear guideway 25 and the transversal linear guideway 26 by using the reinforcing sheet 24, so that the movement of the positioning member 2 can be limited to a movement parallel to the longitudinal direction or the width direction of the seat 1. That is to say, the positioning member 2 cannot be rotated with respect to the seat 1, thereby reducing the damage probability.

The synchronous module 311 of the moving carriage 31 only has the gear 3111 rollably engaged with the rack 112. The limiting carrier 313 has a plane 3131 corresponding in position to the positioning balls 14 and two guiding surfaces 3132 respectively connected to two opposite edges of the plane 3131. The plane 3131 has a hole 3133 recessed on a center portion thereof. Thus, when the moving carriage 31 is moved along the track 11, the positioning balls 14 can be guided by the two guiding surfaces 3132 and the plane 3131, so that the hole 3133 of the limiting carrier 313 can be used to selectivity sleeve at one of the positioning balls 14 for positioning the moving carriage 31 at a predetermined position (i.e., the positions of the moving carriage 31 as shown in FIGS. 6 to 8).

The top surface of the manipulating bar 32 has a pressing surface 321 arranged adjacent to the moving carriage 31 and an arced surface 322 slantingly extending from an end of the pressing surface 321. Accordingly, a user can press the pressing surface 321 by instinct for avoiding pressing a portion of the manipulating bar 32 away from the moving carriage 31 (i.e., the arced surface 322), so that the user does not give a larger torsion to the manipulating bar 32, thereby increasing the service life of the manipulating bar 32. Moreover, a distance between the manipulating bar 32 and the seat 1 can be adjusted according to the user's demand, and is not limited to the figures of the present embodiment.

The top fixing pillars 341 of the top fixing member 34 in the present embodiment are a plurality of round pillars arranged in two rows and in a staggered arrangement, so that the top releasing film Si can be accurately fixed on the top fixing pillars 341 for avoiding an offset problem.

The bottom fixing pillars 351 of the bottom fixing member 35 in the present embodiment are a plurality of round pillars arranged at two opposite sides of the magnetic cover 354. The height of the magnetic cover 354 can be increased to receive a larger magnet, so that the magnetic force between the magnetic cover 354 and the magnetic block 353 is effectively increased for firmly fixing the bottom releasing film S2. If the height of the magnetic cover 354 is increased, the cantilever 312 of the moving carriage 31 can be formed with a notch 3121 corresponding in position to the magnetic cover 354, so that the magnetic cover 354 can pass through the notch 3121 when the magnetic cover 354 is separated from the magnetic block 353.

Moreover, the outer diameter of the rod 351 and a distance between the rod 351 and the seat 1 can be adjusted according to the user's demand, and the present disclosure is not limited to the figures. For example, the outer diameter of the rod 351 can be increased to rapidly roll the bottom releasing film S2 when the first mechanism 3 is operated, so that a problem associated with the contact between the bottom releasing film S2 and the communication device C can be avoided.

The stand 41 of the second mechanism 4 further includes a limiting carrier 411 slidably disposed on the rail 113. The limiting carrier 411 has a plane 4111 corresponding in position to the positioning balls 14 and two guiding surfaces 4112 respectively connected to two opposite edges of the plane 4111. The plane 4111 has a hole 4113 recessed on a center portion thereof. Thus, when the stand 41 is moved along the track 11, the positioning balls 14 can be guided by the two guiding surfaces 4112 and the plane 4111, so that the hole 4113 of the limiting carrier 411 can be used to selectivity sleeve at one of the positioning balls 14 for positioning the stand 41 at a predetermined position (i.e., the positions of the stand 41 as shown in FIGS. 9 and 10).

The inhaling member 42 of the second mechanism 4 can be installed on the stand 41 by a square column 44. The inhaling member 42 is movable along the stand 41, but cannot be rotated with respect to the stand 41. At least 60% of the inhaling member 42 (i.e., the right portion of the inhaling member 42 as shown in FIG. 15) is arranged at one side of the square column 44 away from the first mechanism 3 (i.e., the right side of the square column 44 as shown in FIG. 15). The manipulating button 422 is arranged on the at least 60% of the inhaling member 42 for providing the first mechanism 3 with a larger operating space.

Moreover, the second mechanism 4 in the present embodiment adapts a plurality of positioning pillars 45 to replace the positioning frame 43 of the first embodiment. The positioning pillars 45 are disposed on a portion of the seat 1 between the positioning potion 12 (i.e., the concavity 12) and the track 11, and the positioning pillars 45 are arranged in one row, so that the positioning pillars 45 are configured to insert into holes formed on the releasing plate H1 for improving the alignment between the glass screen film H and the communication device C.

It should be noted that the inhaling member 42 is preferably used to suck a portion of the glass screen film H located adjacent to the positioning pillars 45 by adjusting the length of the square column 44, so that when the releasing plate H1 is separated from the glass screen film H, damage of the glass screen film H can be effectively reduced, but the present disclosure is not limited thereto.

Figure 17:
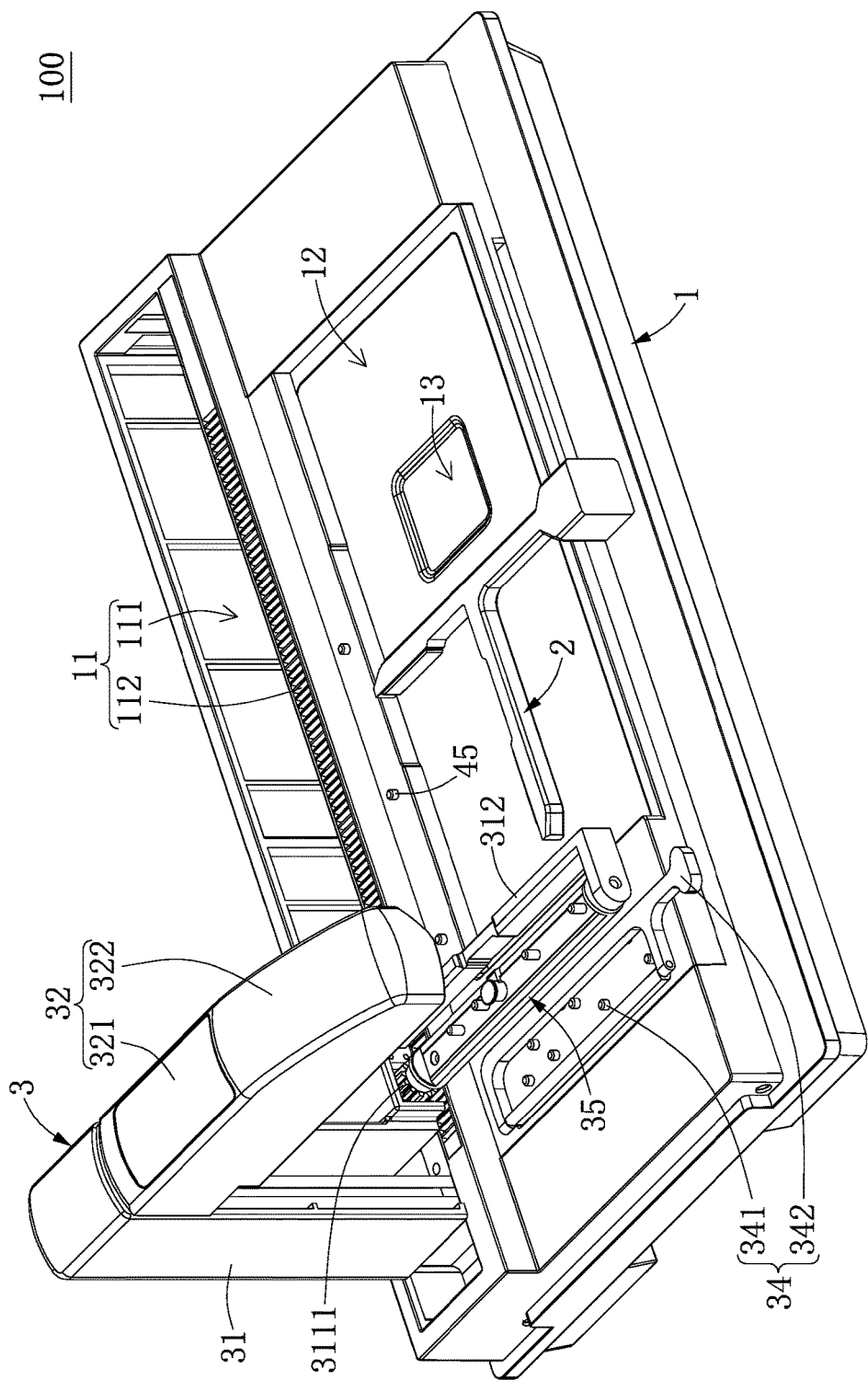
FIG. 17 is a perspective view showing the screen film applicator of the second embodiment in another structure.

Besides, the structure of the screen film applicator 100 in the present embodiment can be adjusted according to the designer's demand. For example, as shown in FIG. 17, the second mechanism 4 of the screen film applicator 100 can be the positioning pillars 45.

[The Effects of the Present Disclosure]

In summary, the first mechanism of the screen film applicator of the present disclosure can be operated in a fixing process to flatly and accurately allow the soft screen film to be adhered onto the communication device, thereby preventing any drawback generated from manpower. Moreover, the screen film applicator can further include the second mechanism, so that the first mechanism and the second mechanism can be selectivity operated to implement an adhesion process of the soft screen film or the glass screen film.

Specifically, the screen film applicator is applied to a communication device, which can be provided in different sizes, by using the cooperation between the positioning portion of the seat and the positioning member. Moreover, the positioning member can be provided with at least one buffering pad for preventing the positioning member and the communication device from a relative movement.

In addition, the screen film applicator of the present disclosure can be provided with the synchronous module to accurately drive the manipulating bar and the bottom fixing member at the same time, and the two pivots of the synchronous module are interconnected with each other by the toothed belt, so that a slippery drawback can be avoided.

Furthermore, the bottom fixing member of the screen film applicator is provided with the magnetic block and the magnetic cover, which are magnetically connected with each other, so that the bottom releasing film can be firmly sandwiched between the magnetic cover and the magnetic block. The magnetic part of the magnetic cover is embedded in the belt, which is connected to the rod, so that a lost drawback of the magnetic part can be effectively avoided.

The descriptions illustrated supra set forth simply the preferred embodiments of the present disclosure; however, the characteristics of the present disclosure are by no means restricted thereto. All changes, alterations, or modifications conveniently considered by those skilled in the art are deemed to be encompassed within the scope of the present disclosure delineated by the following claims.

What is claimed is:

1. A screen film applicator, comprising:
    a seat having a track and a positioning region arranged at one side of the track for positioning a communication device;
    a positioning member disposed on the seat, wherein the positioning member is movable with respect to the seat, and the positioning member and the positioning region are configured to clamp the communication device; and
    a first mechanism disposed on the seat for allowing a soft screen film to be adhered onto the communication device, wherein the first mechanism includes:
        a top fixing member disposed on the seat, wherein the top fixing member is configured to fix a top releasing film adhered on the soft screen film;
        a moving carriage movable along the track of the seat;
        a bottom fixing member movable with the moving carriage, wherein the bottom fixing member is configured to fix a bottom releasing film adhered on the soft screen film; and
        a roller synchronously movable with the moving carriage, wherein when the moving carriage is moved away from the top fixing member, the roller is configured to gradually press the soft screen film onto the communication device.

2. The screen film applicator as claimed in claim 1, wherein the first mechanism further includes a manipulating bar installed on the moving carriage, and the bottom fixing member is installed on the moving carriage, wherein when the moving carriage is moved away from the top fixing member, the manipulating bar is synchronously moved with the moving carriage and is configured to be pressed toward the seat.

3. The screen film applicator as claimed in claim 2, wherein the top fixing member includes a plurality of top positioning pillars disposed on the seat and a covering plate pivotally connected to the seat, the top positioning pillars are configured to respectively insert into holes formed on a portion of the top releasing film, and the covering plate and the seat are configured to clamp the portion of the top releasing film.

4. The screen film applicator as claimed in claim 2, wherein an end of the bottom fixing member is connected to the moving carriage, and the bottom fixing member includes an elongated rod, a plurality of bottom fixing pillars disposed on the rod, a magnetic block embedded in the rod and arranged between two of the bottom fixing pillars, and a magnetic cover movably connected to the rod, wherein the bottom fixing pillars are configured to respectively insert into holes formed on a portion of the bottom releasing film, and the magnetic cover and the magnetic block are detachably connected to each other for clamping the portion of the bottom releasing film.

5. The screen film applicator as claimed in claim 2, wherein the positioning region is a concavity recessed on a top surface of the seat, the positioning member includes an L-shaped abutting portion movable in the concavity, and the abutting portion and an inner corner of the concavity are configured to respectively clamp two diagonal corners of the communication device.

6. The screen film applicator as claimed in claim 1, wherein the moving carriage includes a limiting carrier, the limiting carrier has a hole formed on a bottom surface of the limiting carrier, the seat includes a plurality of positioning balls corresponding in position to the bottom surface of the limiting carrier, the positioning balls are spaced away from each other and are arranged in one row parallel to the bottom surface of the limiting carrier, and the hole formed on the bottom surface of the limiting carrier is configured to selectively sleeve at one of the positioning balls.

7. The screen film applicator as claimed in claim 1, wherein the positioning member includes a T-shaped shaft disposed on the seat, a reinforcing sheet, a longitudinal linear guideway, and a transversal linear guideway, wherein the reinforcing sheet, the longitudinal linear guideway, and the transversal linear guideway are fastened to the seat, the longitudinal linear guideway and the transversal linear guideway are interconnected to each other, and the reinforcing sheet is fixed to the T-shaped shaft and one of the longitudinal linear guideway and the transversal linear guideway.

8. The screen film applicator as claimed in claim 1, further comprising a second mechanism disposed on the seat for allowing a glass screen film to be adhered onto the communication device, wherein the first mechanism and the second mechanism are not manipulated at the same time, and the second mechanism includes:
   a stand disposed on the seat; and
   an inhaling member installed on the stand, wherein the inhaling member is manipulatable to suck the glass screen film.

9. The screen film applicator as claimed in claim 8, wherein the stand is movable along the track of the seat, and the inhaling member is synchronously moved with the stand and is configured to be pressed toward the seat along the stand for sucking the glass screen film.

10. The screen film applicator as claimed in claim 8, wherein the second mechanism includes a plurality of positioning pillars disposed on a portion of the seat between the positioning region and the track, the positioning pillars are arranged in one row, and the positioning pillars are configured to insert into holes formed on a releasing plate adhered to the glass screen film.

\* \* \* \* \*